United States Patent
Hoogendoorn

(10) Patent No.: US 12,406,372 B2
(45) Date of Patent: Sep. 2, 2025

(54) IMAGE PROCESSING APPARATUS, A METHOD OF PROCESSING IMAGE DATA, AND A COMPUTER PROGRAM PRODUCT

(71) Applicant: CANON MEDICAL SYSTEMS CORPORATION, Otawara (JP)

(72) Inventor: Corné Hoogendoorn, Edinburgh (GB)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 333 days.

(21) Appl. No.: 17/662,719

(22) Filed: May 10, 2022

(65) Prior Publication Data

US 2023/0368387 A1 Nov. 16, 2023

(51) Int. Cl.
| | |
|---|---|
| G06T 7/38 | (2017.01) |
| G06T 7/00 | (2017.01) |
| G06T 7/11 | (2017.01) |
| G06T 7/73 | (2017.01) |

(52) U.S. Cl.
CPC .............. *G06T 7/0016* (2013.01); *G06T 7/11* (2017.01); *G06T 7/38* (2017.01); *G06T 7/75* (2017.01); *G06T 2207/10096* (2013.01); *G06T 2207/30104* (2013.01)

(58) Field of Classification Search
CPC ....................................................... G06T 7/00
See application file for complete search history.

(56) References Cited

U.S. PATENT DOCUMENTS

| | | | |
|---|---|---|---|
| 5,150,292 A | 9/1992 | Hoffmann et al. | |
| 7,522,744 B2 | 4/2009 | Bai et al. | |
| 9,398,855 B2 * | 7/2016 | Miao | A61B 6/5205 |
| 11,045,246 B1 * | 6/2021 | Schwartz | A61F 5/4553 |
| 2002/0010551 A1 | 1/2002 | Wang et al. | |
| 2007/0055148 A1 * | 3/2007 | Klingenbeck-Regn | A61B 6/504 600/431 |
| 2008/0097196 A1 | 4/2008 | Licato et al. | |
| 2009/0226057 A1 * | 9/2009 | Mashiach | G06T 5/70 382/128 |
| 2012/0041301 A1 | 2/2012 | Redel | |

(Continued)

FOREIGN PATENT DOCUMENTS

| | | | | |
|---|---|---|---|---|
| CN | 105678102 A | | 6/2016 | |
| CN | 106060080 B | * | 7/2019 | ........... H04L 65/602 |

(Continued)

*Primary Examiner* — Di Xiao
(74) *Attorney, Agent, or Firm* — Oblon, McClelland, Maier & Neustadt, L.L.P.

(57) ABSTRACT

An image processing apparatus comprises processing circuitry configured to obtain first medical image data captured at a first time and second medical image data captured at a second time different from the first time, the first medical image data and the second medical image data including data representing a bolus of contrast material in a tubular anatomical structure, wherein the bolus of contrast material has moved between the first time and the second time; determine an expected motion of the bolus of contrast material through the tubular anatomical structure between the first time and the second time; and perform a registration process to obtain a registration of the first medical image data and the second medical image data based at least in part the expected motion of the bolus of contrast material through the tubular anatomical structure.

20 Claims, 10 Drawing Sheets

(56) References Cited

U.S. PATENT DOCUMENTS

| | | |
|---|---|---|
| 2012/0072190 A1 | 3/2012 | Sharma et al. |
| 2013/0253895 A1 | 9/2013 | Okell et al. |
| 2016/0038111 A1* | 2/2016 | Maidment .............. A61B 6/482 424/9.4 |
| 2016/0128601 A1 | 5/2016 | McConnell et al. |
| 2017/0018081 A1 | 1/2017 | Taylor et al. |
| 2018/0224365 A1 | 8/2018 | Kamiya et al. |
| 2019/0304592 A1 | 10/2019 | Ma et al. |
| 2020/0022664 A1 | 1/2020 | Moore et al. |
| 2020/0143528 A1* | 5/2020 | Kulkarni ................... G06T 5/73 |
| 2020/0294213 A1 | 9/2020 | Vaillant et al. |
| 2020/0320751 A1 | 10/2020 | Siemionow et al. |
| 2021/0252309 A1* | 8/2021 | Yan ....................... G06T 11/005 |
| 2021/0350549 A1* | 11/2021 | Lu ........................ A61B 8/0883 |

FOREIGN PATENT DOCUMENTS

| | | |
|---|---|---|
| CN | 111932652 A | 11/2020 |
| CN | 111222281 B * | 6/2023 |
| DE | 10 2012 206 542 A1 | 10/2013 |
| EP | 0 625 885 A1 | 11/1994 |
| EP | 3 093 678 A1 | 11/2016 |
| EP | 3 586 747 A1 | 1/2020 |
| JP | 2016-63976 A | 4/2016 |
| WO | WO 93/15658 A1 | 8/1993 |
| WO | WO 2014/192990 A1 | 12/2014 |

* cited by examiner

IMAGE PROCESSING APPARATUS, A METHOD OF PROCESSING IMAGE DATA, AND A COMPUTER PROGRAM PRODUCT

FIELD

Embodiments described herein relate generally to an image processing apparatus, a method of processing image data, and a computer program product.

BACKGROUND

It is known to use image registration to obtain motion correction for images obtained at different points in time. Image registration can be used to spatially transform one image to match corresponding objects in another image. However, in multi-phase angiographic images the location of a contrast bolus will have moved between images. Image intensity differences between phases in multi-phase angiography images may thus stem both from motion of features between images, and contrast progression. Only the motion component represents a spatial change of anatomical features between the images. However, image registration-based motion correction will attempt to resolve both types using spatial transformation. Thus, the application of known image registration methods to multi-phase angiographic images, or other images that include a contrast bolus, can lead to the contrast bolus location being transformed along the vessel to match the images. This can result in, for example, a spatial deformation that does not reflect or respect local anatomy, or matching of different contrast agent levels due to diffusion between the time points associated with the two images, or an odd-looking transformed image due to large amounts of local stretching and adjacent compression arising from the registration.

BRIEF DESCRIPTION OF THE DRAWINGS

Embodiments are now described, by way of non-limiting example, and are illustrated in the following figures, in which.

DETAILED DESCRIPTION

Certain embodiments provide an image processing apparatus, comprising processing circuitry configured to:
obtain first medical image data captured at a first time and second medical image data captured at a second time different from the first time, the first medical image data and the second medical image data including data representing a bolus of contrast material in a tubular anatomical structure, wherein the bolus of contrast material has moved between the first time and the second time;
determine an expected motion of the bolus of contrast material through the tubular anatomical structure between the first time and the second time; and
perform a registration process to obtain a registration of the first medical image data and the second medical image data based at least in part the expected motion of the bolus of contrast material through the tubular anatomical structure.

Certain embodiments provide a method of processing image data comprising:
obtaining first medical image data captured at a first time and second medical image data captured at a second time different from the first time, the first medical image data and the second medical image data including data representing a bolus of contrast material in a tubular anatomical structure, wherein the bolus of contrast material has moved between the first time and the second time;
determining an expected motion of the bolus of contrast material through the tubular anatomical structure between the first time and the second time; and
performing a registration process to obtain a registration of the first medical image data and the second medical image data based at least in part the expected motion of the bolus of contrast material through the tubular anatomical structure.

Figure 1:
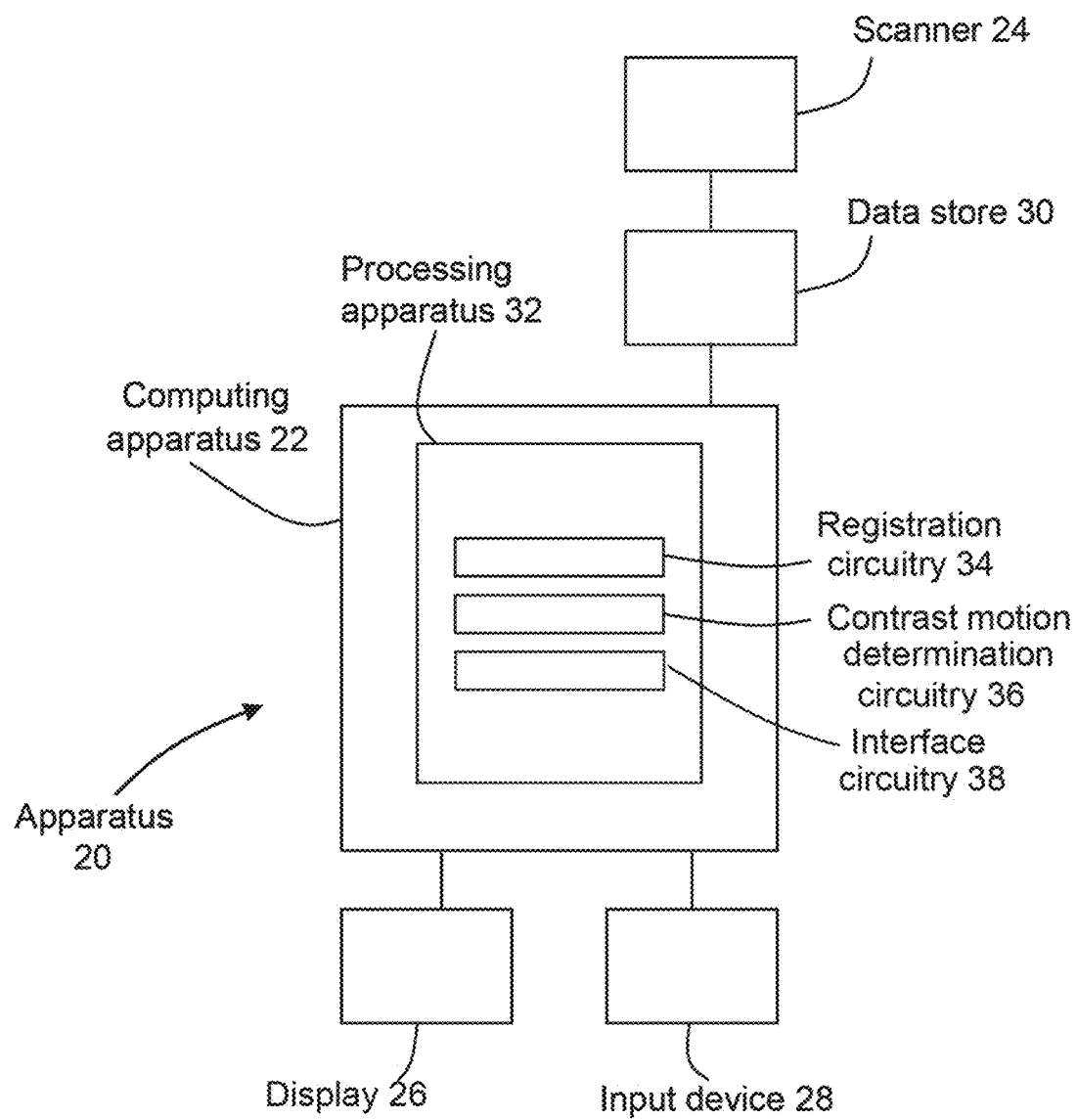
FIG. 1 is a schematic illustration of an apparatus in accordance with an embodiment.

Certain embodiments provide a computer program product comprising computer readable instructions that are executable to perform a method comprising:
obtaining first medical image data captured at a first time and second medical image data captured at a second time different from the first time, the first medical image data and the second medical image data including data representing a bolus of contrast material in a tubular anatomical structure, wherein the bolus of contrast material has moved between the first time and the second time;
determining an expected motion of the bolus of contrast material through the tubular anatomical structure between the first time and the second time; and
performing a registration process to obtain a registration of the first medical image data and the second medical image data based at least in part the expected motion of the bolus of contrast material through the tubular anatomical structure A data processing apparatus 20 according to an embodiment is illustrated schematically in FIG. 1. In the present embodiment, the data processing apparatus 20 is configured to process medical imaging data. In other embodiments, the data processing apparatus 20 may be configured to process any other suitable image data.

The data processing apparatus 20 comprises a computing apparatus 22, which in this case is a personal computer (PC) or workstation. The computing apparatus 22 is connected to a display screen 26 or other display device, and an input device or devices 28, such as a computer keyboard and mouse.

The computing apparatus 22 is configured to obtain image data sets from a data store 30. The image data sets have been generated by processing data acquired by a scanner 24 and stored in the data store 30.

The scanner 24 is configured to generate medical imaging data, which may comprise two-, three- or four-dimensional data in any imaging modality. For example, the scanner 24 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner.

The computing apparatus 22 may receive medical image data and/or the further conditioning data from one or more further data stores (not shown) instead of or in addition to data store 30. For example, the computing apparatus 22 may receive medical image data from one or more remote data stores (not shown) which may form part of a Picture Archiving and Communication System (PACS) or other information system.

Computing apparatus 22 provides a processing resource for automatically or semi-automatically processing image data. Computing apparatus 22 comprises a processing apparatus 32. The processing apparatus 32 comprises registration circuitry 34 for registering two or more image data sets. The processing apparatus 32 also comprises contrast motion determination circuitry 36 configured to determine motion, for example expected motion, of contrast material between images. The apparatus 32 also includes interface circuitry 38 configured to obtain user or other inputs and/or to output rendered image frames or other image data, for example to the display screen 26 for display.

In the present embodiment, the circuitries 34, 36, 38 are each implemented in computing apparatus 22 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 1 for clarity.

The data processing apparatus 20 of FIG. 1 is configured to perform methods as illustrated and/or described in the following.

It is a feature of certain embodiments that the contrast motion determination circuitry 36 determines motion of contrast material through a tubular anatomical structure that is the subject of medical images, between a first time point at which a first of the images is obtained, and a second time point at which a second of the images is obtained. The determined motion, which may be an expected motion, is then used in determining a registration of the first and second images. For example, the expected motion of the contrast material may be used to adjust one or both of the data representing the first and second images.

Figure 2:
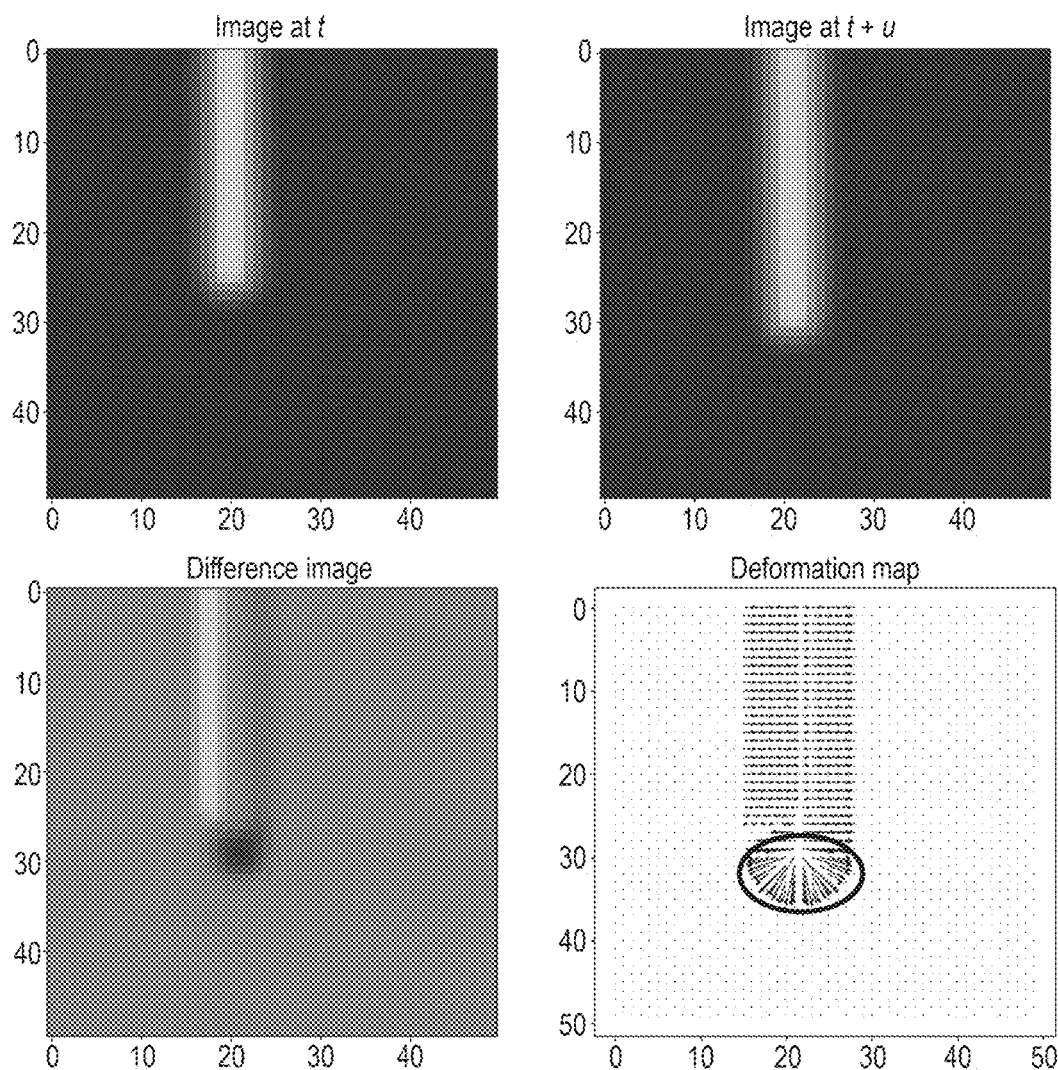
FIG. 2 shows images of a region at two different times, a difference image based on a registration, and a representation of a deformation map.

Before considering processes according to embodiments in more detail, FIG. 2 shows the progression of a bolus of contrast material between time t (top left image) and time t+u (top right image). The images are simulated images generated using mock vessels based on a σ=1 Gaussian smoothed trace of a 3-pixel width bolus along a straight line. At time t+u the bolus has been shifted sideways by 1 pixel (for example, representing movement of anatomical features in the imaging volume between time t and time t+u) and extended forward by 5 pixels.

The bottom right image is a deformation map resulting from a registration of the images at times t and t+u based on optimizing a dense deformation field using a stochastic gradient descent (SGD) method. The registration is obtained without taking into account bolus progression between images. The registration at the end part of the bolus path is not accurate, for example in the region circled by the solid line in the image. This leads to distortion in the difference image, shown in the bottom left hand corner of FIG. 2, obtained by subtracting the image at time t from the image at time t+u after the image at time t+u has been transformed in accordance with the registration.

Figure 3:
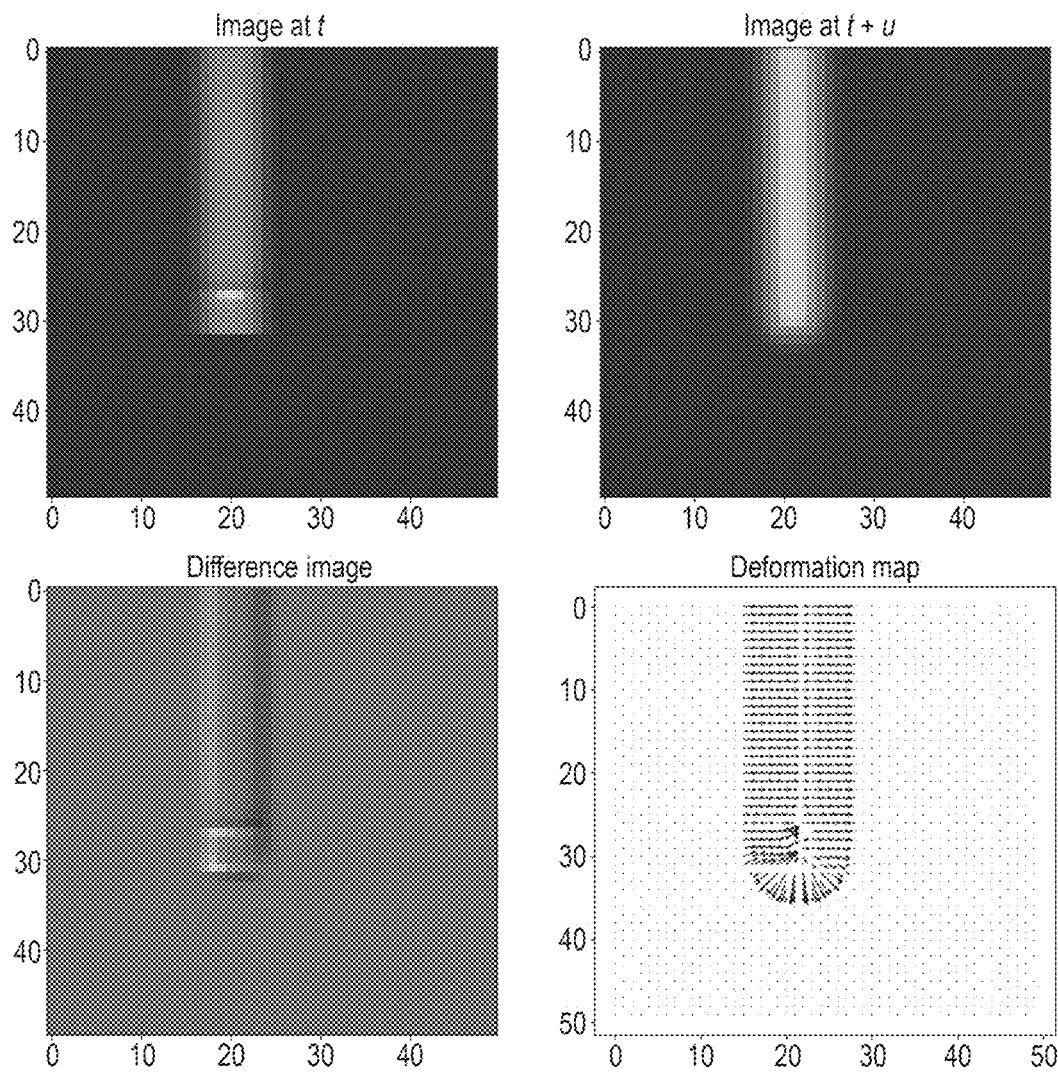
FIG. 3 shows images of a region at two different times, a difference image based on a registration, and a representation of a deformation map, wherein the registration procedure is in accordance with an embodiment and includes a simulation of flow of the contrast material between images.

In contrast, FIG. 3 shows the same data as FIG. 2 but subject to processes according to an embodiment. Again, the progression of a bolus of contrast material between time t (top left image) and time t+u (top right image) is shown. The images are simulated images generated using mock vessels based on a σ=1 Gaussian smoothed trace of a 3-pixel width bolus along a straight line. At time t+u the bolus has been shifted sideways by 1 pixel (for example, representing movement of anatomical features in the imaging volume between time t and time t+u) and extended forward by 5 pixels.

Again, the bottom right image is a deformation map resulting from a registration of the images at times t and t+u. However, in this example, progression of the bolus of contrast material has been predicted and the contrast material at time t has been extended from its original position thereby simulating contrast flow. In this example, a flow simulation is done to take 5 steps (pixels) forward, based on the preceding 10 slices. Specifically, the extension of the vessel is the profile obtained from those 10 preceding slices, copied in 5 times. This was a simple way of illustrating the extending the vessel in the present simulated example. The results of these operations are used to predict where the bolus of contrast material would have reached at time t+u, and the image data at time t is adjusted accordingly to extend the region where contrast material is present for time t. This extension of the contrast region can be seen by comparing the top left hand images in FIGS. 2 and 3.

The registration is then performed using the adjusted image data (e.g. with the contrast region extended) for time t and the image data for time t+u in the registration procedure.

The bottom right image is a deformation map resulting from a registration of the images at times t and t+u, with the region where contrast material is present at time t being extended as discussed in the preceding paragraph. The bottom left image is the difference image obtained by subtracting the image at time t from the image at time t+u after the image at time t+u has been transformed in accordance with the registration. The resulting difference image shows less distortion than the corresponding difference image of FIG. 2 that was obtained without extending the contrast region based on expected motion of the contrast region.

FIGS. 2 and 3 provide a simplified example. According to various embodiments, contrast progression is predicted prior to spatial registration. Then, either the predicted contrast progression is used to synthesize contrast in an image for an image at an earlier time, or to remove contrast in an image at a later time, with the images for the earlier and later time points then being subject to a registration process, for example to register the later image to the earlier image or vice versa. Data representing the contrast bolus can be removed or modified. Thus, effectively, a contrast region where a bolus of contrast material is present, or expected to be present, may be extended or shortened and the extended and/or shortened regions can be used in the registration process.

Alternatively or additionally, at least parts of the images, or features of the images, at a region at or around the region to which the contrast material is predicted to progress can be, in relation to the registration process, ignored, weighted or subject to different processing than other regions.

According to certain embodiments, the prediction of progression of contrast material between earlier and later times comprises determining the expected motion of a bolus of contrast material using an estimated size and direction of blood vessel or other tubular structure through which the bolus passes. For example, some embodiments use the feature that vessels are tubular structures and that these can be detected using filters of appropriate properties, for example Sato or Frangi filters.

The Sato, Frangi or other filter can be applied to imaging data to provide an output that represents the probability that a region represents a vessel, e.g. they can determine a local 'vesselness' probability. For example, the filter may provide a probability for pixels or voxels of the image data being part of, or within, vessel or other tubular anatomical structure.

It is also the case the flow velocity, for example of the bolus of contrast material, usually depends on vessel size, and the standard deviation or other measure of the width of the Sato, Frangi or other similar filters associated with the strongest local response is directly linked to vessel size.

Furthermore, vessels in human or other anatomy generally make gradual rather than abrupt changes in direction, and current direction of flow is usually a good indication of the short-term future direction of flow.

A process according to an embodiment that uses a filter and takes into account certain vessel properties discussed above is illustrated schematically in FIG. 4.

At the first stage 30 image data representing anatomy of a subject present in an imaging volume is obtained, either from scanner 14 or as stored data from memory 20. The image data represents the volume is obtained for a succession of times, and it is desired to register the image data for time=t to image data obtained for at least one other time.

At the next stage 32, the presence and location of a bolus of contrast material present in a vessel at time t is determined by applying a filter to the image data for time=t, also referred to as the target image. The filter output is compared to a threshold, in this embodiment $10^{\lceil \log_{10}(x) \rceil}$, to determine a skeleton representing the filter output that is above the threshold. The thresholded output from the filter can be considered to be or represent a segmentation of the bolus of contrast material present in the vessel, and thus of at least part of the vessel itself.

At the next stage 34, a direction of the vessel is determined from the determined location of the bolus of contrast material present in the vessel. In the present embodiment, the last n pixels along the skeleton are determined, where n is an integer (n=10 in the present example). A weighted average of direction is then determined, with greater weight being given to pixels nearer the end point of bolus of contrast material in the vessel. In the present example, the equation $$w_i = \frac{1}{\sum w}(1 - 0.1i)$$

is used to determin the weightings, where i is an integer from 1 to 10 and represents the last 10 pixels. The pixels in question can be fitted to any suitable fitting function to determine the direction of the vessel.

At the next stage 36, a weighted average of the vessel size (for example, diameter, cross-sectional area or any other suitable measure of size) is determined using the thresholded output of the filter or any other suitable segmentation of the bolus of contrast material and thus the vessel.

At the next stage 38, the calculated direction of the vessel from the end-point of the bolus of contrast material obtained at stage 34 and the calculated size of the vessel determined at stage 36, are used to determine the expected progression of the bolus of contrast material between time t and time t+u (or any other desired time) where t and u can have any suitable selected and/or predetermined values. Any suitable technique can be used for this calculation, for example any suitable fluid flow equation or model. In the present example a model representing a diffusion process is used. The calculation is based on an understanding that the bolus of contrast material will progress through a tube of the calculated size, for a distance dependent on the calculated size, in the calculated direction between times t and t+u.

The fluid flow equations or models used may reflect expected fluid flow (e.g. blood and contrast agent) through the vessel. This can give an estimate of distance to the new end point of the bolus in the absence of any diffusion. Diffusion equations governing the diffusion of contrast agent into the blood can be used to adjust intensity levels within and immediately ahead of the extension. A range of adaptations or simplifications of these models can be used in embodiments, including neural network-based prediction of the extension, or in simpler approaches copying the bolus profile immediately preceding the vessel end point. Examples of fluid flow equations that may be used in embodiments to model the fluid flow are Bernouilli's equation and the Navier-Stokes equations. An example of diffusion equations that may be used in embodiments are Fick's laws of diffusion.

At the next stage 40, the contrast region in the image data for time t or time t+u is modified, for example shortened or extended, based on the expected motion of the bolus of contrast material determined at stage 38.

At the next stage 42, a registration process is performed to obtain a registration of the first image data at time t and the second image data at time t+u. Any suitable registration process can be performed, for example any suitable rigid or non-rigid registration process. The image data as adjusted at stage 40 based on the expected motion of the bolus of contrast material is used in the registration process.

In alternative embodiments, one or more features of the registration process at stage 42 are modified based on the expected motion of the bolus of contrast material, as well as or instead of the first and second data sets that are subject to the registration process being modified at stage 40. For example, in some embodiments, the registration process includes ignoring or weighting a contrast region where the bolus of contrast material is present or is expected to be present based on the determined expected motion of the contrast material.

The modifying at stage 40 of the first image data at time t and the second image data at time t+u can be performed in any suitable way. For example, simulated data representing at least part of the bolus of contrast material can be added to the first image data and/or the second image data, or data representing at least part of the bolus may be copied from one of the first image data and the second image data to the other of the first image data and the second image data. Any other suitable modifications of the first image data and/or second image data may be performed based on the expected motion of the bolus of contrast material.

A filter is applied at stage 32, but in alternative embodiments any other suitable process, for example any suitable segmentation process may be used to determine the presence and/or location of the contrast material in the vessel or other tubular structure.

Figure 4:
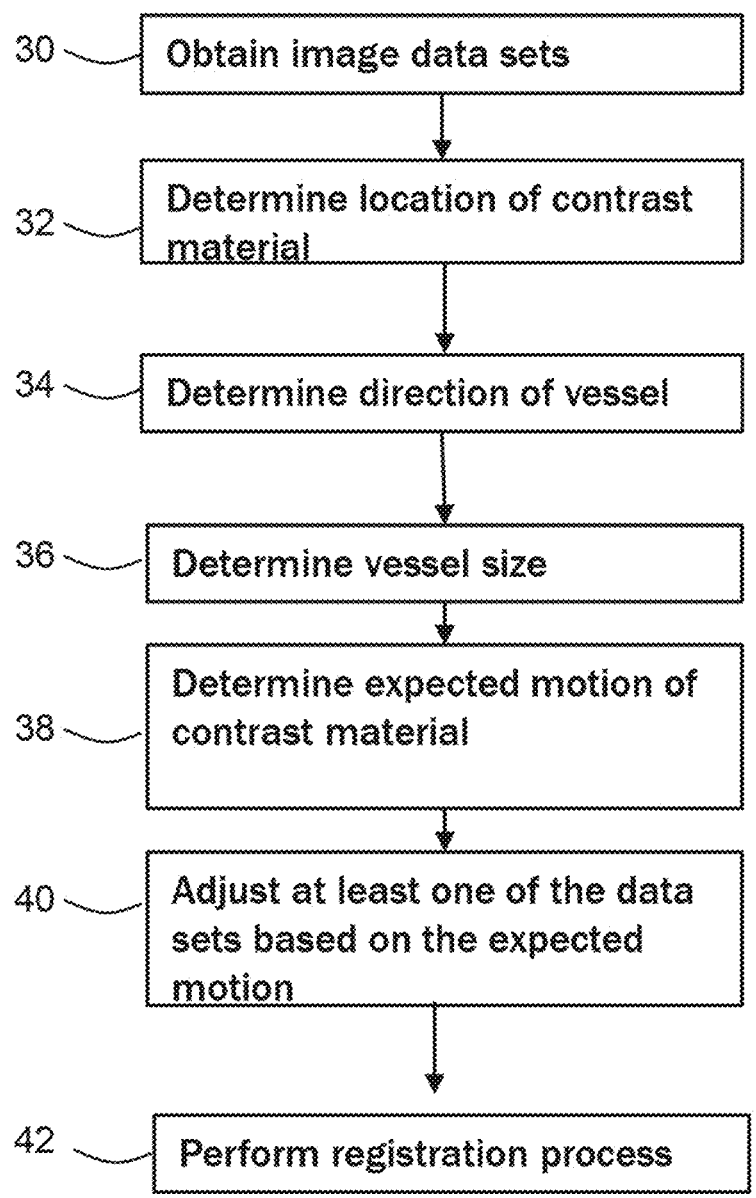
FIG. 4 is a flowchart illustrating in overview a process according to an embodiment.

FIGS. 5 to 10 are images illustrating application of a process according to an embodiment of FIG. 4 to progression of bolus of contrast material along a simulated vessel.

Figure 5:
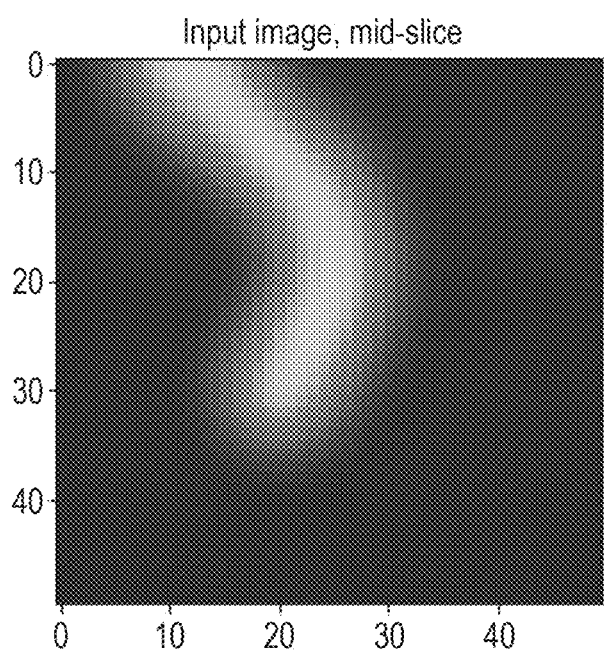
FIG. 5 is an image of a curved vessel.

The simulated vessel is illustrated in FIG. 5, and is generated from a Bezier curve that is dilated by five pixels and smoothed using a Gaussian with a standard deviation of 2. The presence of a bolus of contrast material in the vessel at time=t is indicated by the lighter areas in the image.

Figure 6:
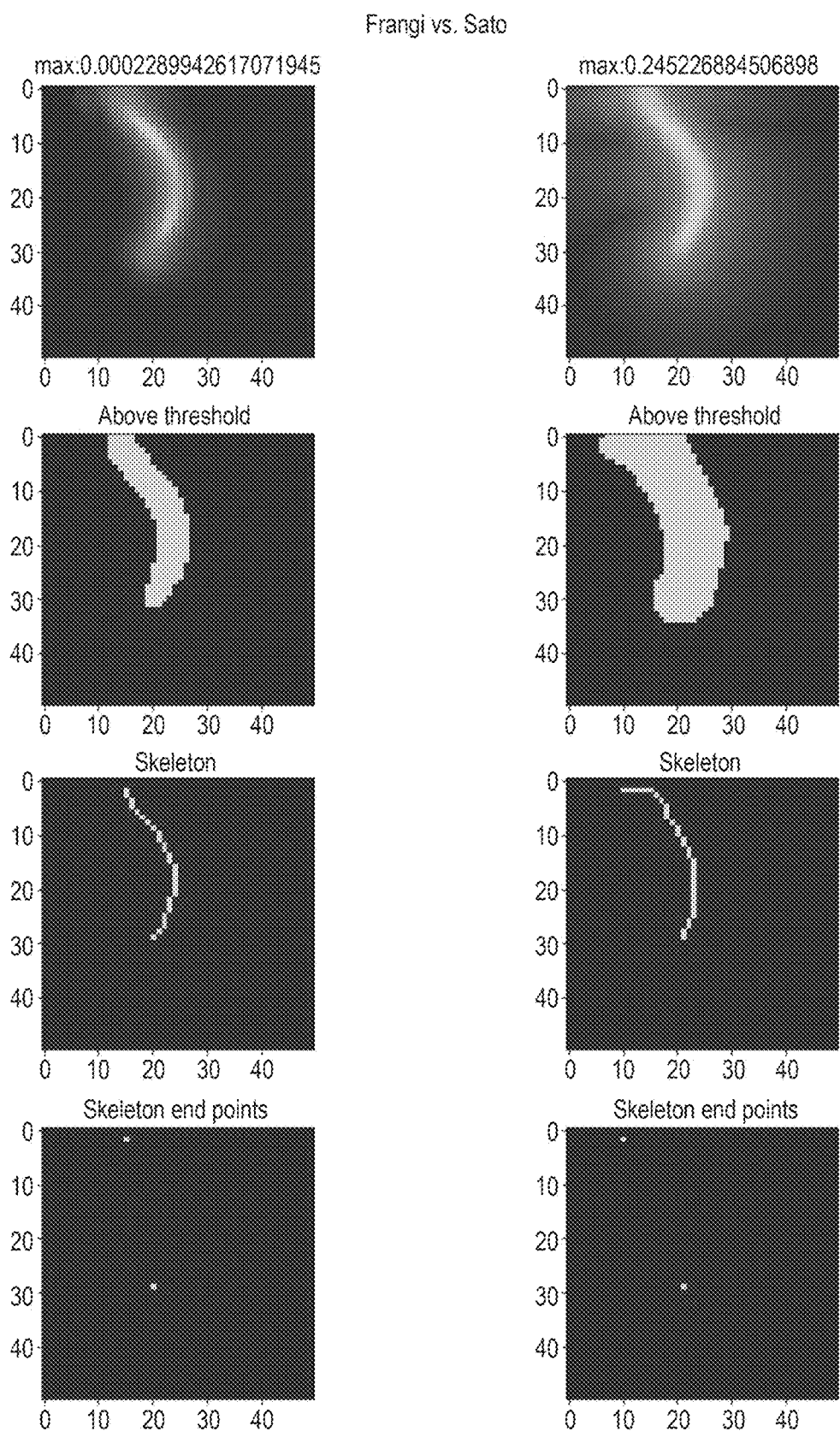
FIG. 6 shows images representing application of filters, thresholding and skeletonisation processes to the image data of FIG. 5.

FIG. 6 illustrates the application to the data of FIG. 5 the filtering and skeletonisation processes described in relation to stage 32 of the process of FIG. 5. The left hand column illustrates the use of a Frangi filter and the right hand column illustrates the use of a Sato filter. The top image of each column shows the output of the filter after application to the image data for time=t. The second image of each column shows the filter output after a thresholding process is applied. The third image represents the thresholded data after being subject to a skeletonization process. The fourth (bottom) image of each column shows the endpoints of the skeleton, representing the beginning and end points of the bolus of contrast material in the image at time=t.

Figure 7:
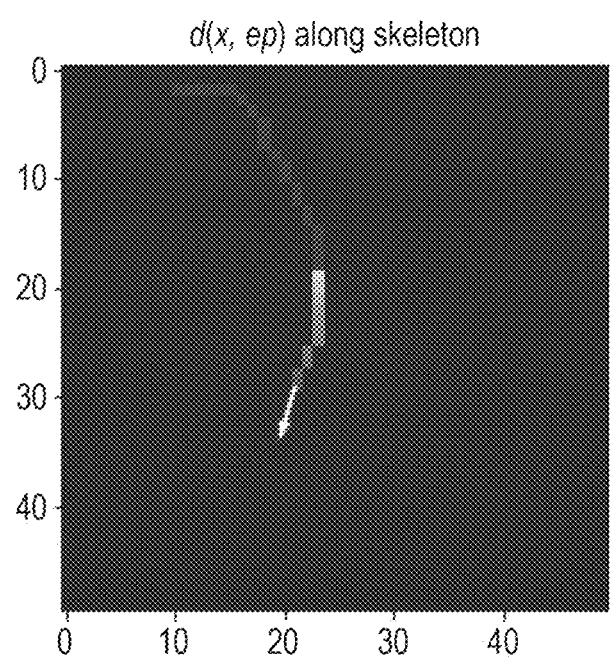
FIG. 7 is an image showing an extension vector representing an expected motion of contrast material determined according to an embodiment.

In FIG. 7 the direction of the vessel beyond the end point of the bolus of contrast material at time=t is as described in relation to stage 34, by using the last n pixels along the skeleton, where n is an integer (n=10 in the present example) and determining a weighted average of direction from those pixels, with greater weight being given to pixels nearer the end point of bolus of contrast material. In the present example, the equation $$w_i = \frac{1}{\sum w}(1 - 0.1i)$$

is used to determine the weightings, where i is an integer from 1 to 10 and representing the last 10 pixels. The arrow included in FIG. 7 indicates the determined direction of the vessel beyond the end point of the bolus of contrast material. The arrow can be considered to represent an extension vector and is not to scale.

Figure 8:
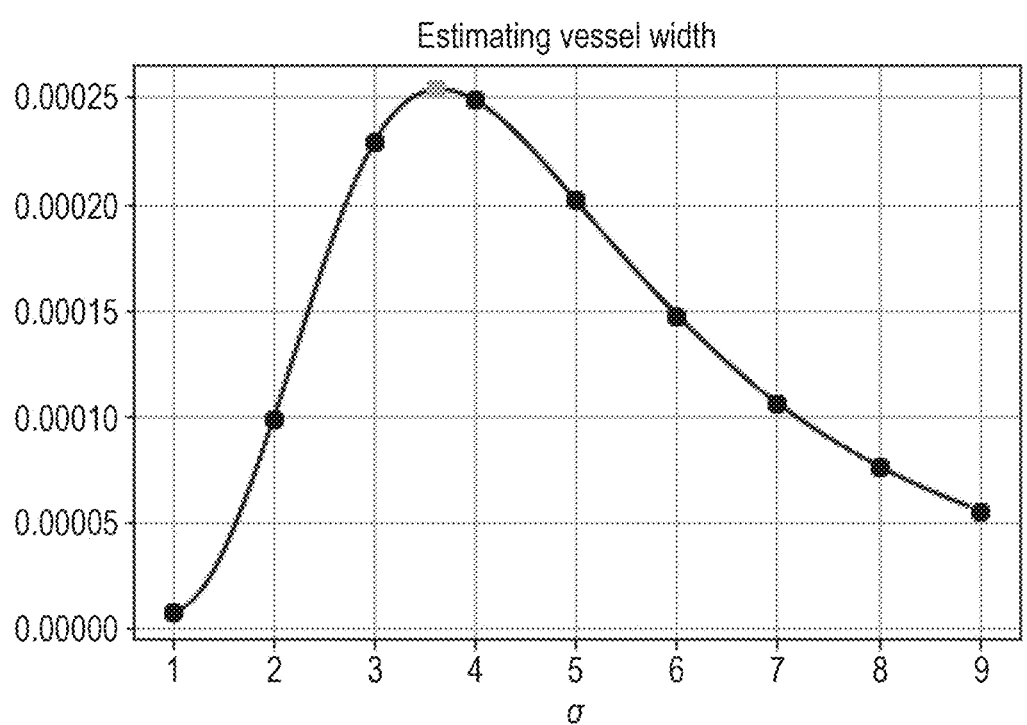
FIG. 8 is a plot representing output of a vesselness filter used to estimate vessel width according to an embodiment.

The outcome of vessel width estimation process applied to the data is illustrated in the graph of FIG. 8, which is a plot of the response of the filter for different values of standard deviation of the filter (in this example, integer values of standard deviation of the Sato filter from 1 to 9). A curve is fitted to the plot and smoothed, and maximum of the curve is used to determine the width of the vessel (e.g. the width of filter that gives the maximum response is taken as indicating the width of the vessel). The filter response used in obtaining vessel width can be determined for any position(s) along the vessel, for example the filter can be applied to the data around the position of one or both of the skeleton end points, or the filter can be applied at several positions and a maximum, average or other measure of response values can be used to determine the filter width maximum and thus vessel width. In some embodiments, different vessel widths can be determined for different positions along the vessel, or a single value of vessel width can be assigned to the whole length of the vessel.

Figure 9:
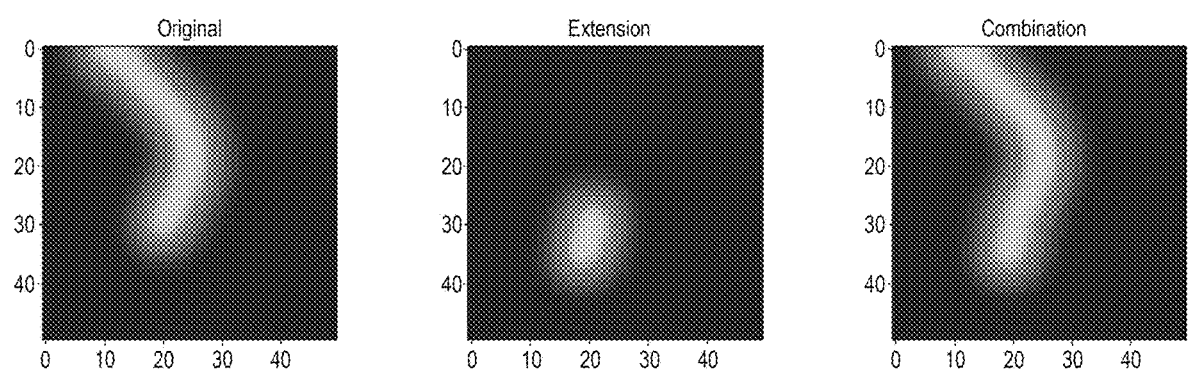
FIG. 9 shows images representing the curved vessel, an extension to the curved vessel determined according to an embodiment, and a combination of the curved vessel and the extension.

Next, as illustrated in FIG. 9, the calculated direction of the vessel from the end-point of the bolus of contrast material and the calculated width of the vessel are used to determine the expected progression of the bolus of contrast material between time t and time t+u. The central image in FIG. 9 shows the expected progression of the bolus of contrast material. In the present example, the bolus of contrast material is calculated as occupying an additional area or other region k*dir, with k=argmin(KL($I_{t+E}$, $I_{(t+u)}$)) at time t+u, beyond the end point of the bolus of contrast material at time=t. In the present example, $v^{1.5}$ is used and the vessel width is 1.5v.

In the mathematical expressions of the preceding paragraph, k is the distance from the bolus end point at time t that is simulates to estimate its end point at time t+u (e.g. the next frame of a sequence of frames). The value may be such as to optimise a similarity between intensity distributions of the image with the simulated extension E ($I_{t+E}$) and the next image $I_{(t+u)}$. This can be done along direction dir as described. KL is the Kullback-Leibler divergence used as metric of image intensity distribution similarity. Other histogram similarity metrics may be used in other embodiments, such as Chi-squared, Bhattacharyya distance, Jeffrey divergence, and others.

In the present example, the image data for time=t (bottom image in FIG. 9) is modified to include contrast in the additional region that the contrast material is calculated to occupy at time t+u in accordance with the calculation described in the preceding paragraph. A representation of the modified image data for time=t is shown in the top image of FIG. 9.

In the present example, the region where it is expected that contrast material would be present at time t+u has been determined and this region is filled with a representation of contrast material in the data for time=t. The resulting modified data for time=t and the original data for time=t+u are then used in a registration process to obtain a registration between the image data sets at time t and time t+u. The resulting registration can be used in any desired fashion, for example to transform one, other, or both of the image data sets, e.g. the original image data sets for the different times so that the image data sets, or resulting images, are aligned without, or with reduced, distortion due to the effect of the motion of the bolus of contrast material between the different times.

Embodiments have been described in which the estimated motion of the bolus of contrast material by a later time point is estimated from the image data at the earlier time point. In other embodiments, the estimated motion of the bolus of contrast material may be determined from one or more later time points to estimate where the bolus of contrast material was present at an earlier time point. For example, in some embodiments the bolus of contrast material may be leaving a vessel and the region where the bolus of contrast material is present may be smaller, or there may be less contrast material present, at the later time than the earlier time. Alternatively or additionally, the bolus of contrast material may be entering or progressing through a vessel and the region where the bolus of contrast material is present may be larger, or there may be more contrast material present, at the later time than the earlier time, and either the estimated motion may be an estimate of where the bolus of contrast material would have been expected to be present at the earlier time, or the estimated motion may be an estimate of where the bolus of contrast material is expected to be present at the later time.

Embodiments can be particularly useful when applied to angiographic data, for example multiphase angiographic data, but embodiments can be used in relation to any suitable imaging data or anatomical features.

Figure 10:
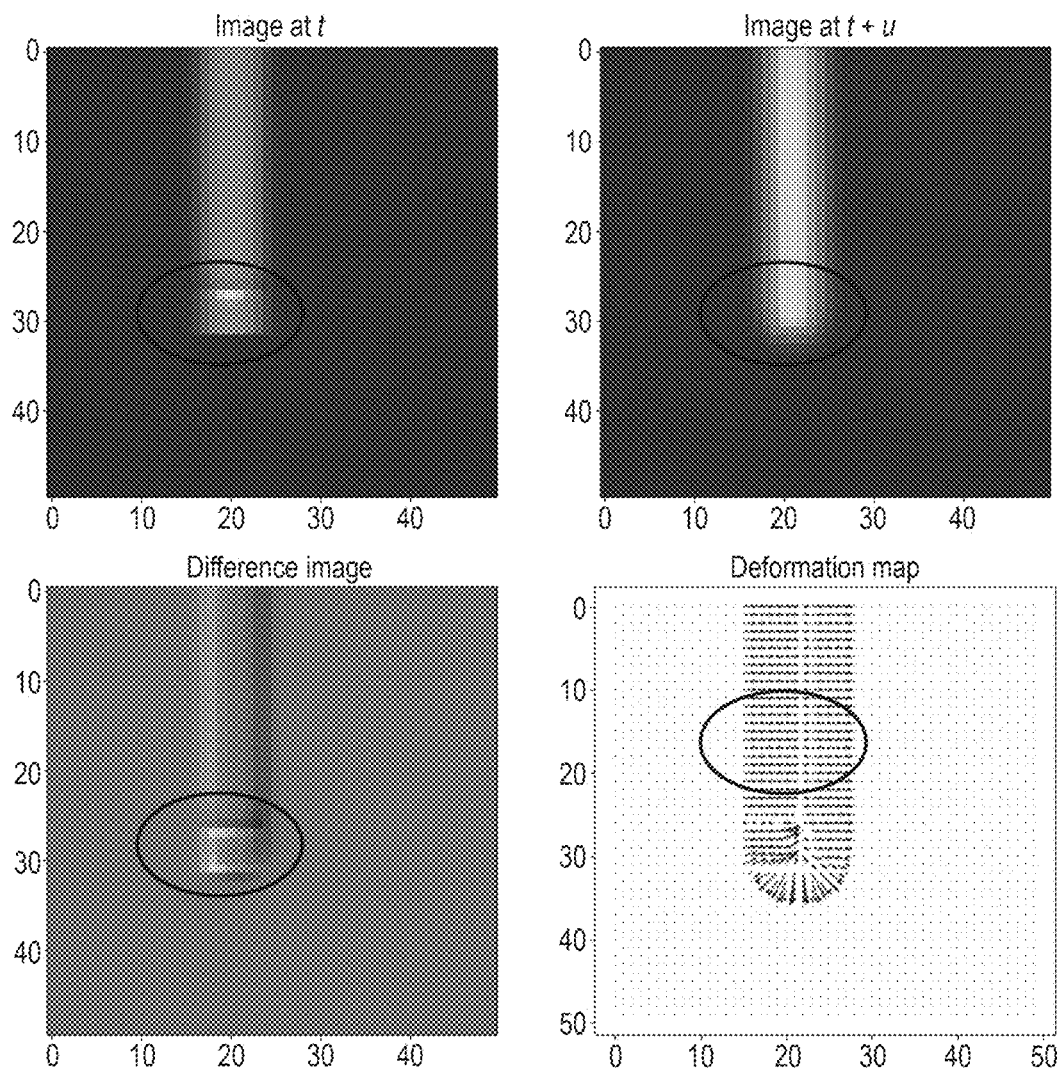
FIG. 10 shows images of a region at two different times, a difference image based on a registration, and a representation of a deformation map, including indications of areas that can be filled with synthesized vessel or with a copy of other vessel areas, as part of a process according to an embodiment.

An example of filling a determined vessel region with synthesized contrast material based on determined size and direction of the vessel is indicated schematically in the top two images of FIG. 10, in similar fashion to the example of FIG. 3, which show the modified image data (top right hand image) and the resulting transformed image following registration (top left hand image), where the oval line is used to indicate the region in question.

In some alternative embodiments, the registration can be performed using the original image data but the registration process, which may include a subsequent transformation process, is modified such that for the region to where the contrast material is calculated to progress between times t and t+u registration parameters, for example deformation field parameters, are transposed or otherwise taken from another region of the volume and used for the region to where the contrast material is calculated to progress. Such an embodiment is illustrated in the bottom two images of FIG. 10, where the bottom right hand image represents a deformation field resulting from the registration, and the oval shape indicates a region from which registration parameters are taken and used for a region (indicated by the oval shape in the resulting transformed bottom right hand shape) to where the contrast material is expected to flow between times t and t+u.

Certain embodiments provide an image processing apparatus, comprising processing circuitry configured to:
obtain a first medical image captured at a first time point and a second medical image captured at a second time point different from the first time point, the first medical image and the second medical image depicting a bolus of contrast material in a tubular anatomical structure;
transform a contrasted region in the first medical image; and
determine a motion of the tubular anatomical structure between the first medical image and the second medical image, based on a contrasted region of the second medical image and the transformed contrasted region in the first medical image.

Certain embodiments provide an image processing method for predicting the image area affected by contrast bolus progression through smoothly curving tubular structures in an image. The image may be a 2D or 3D image acquired while a contrast agent (e.g. bolus) is introduced to the tubular structures. The contrast enhancement may be used to determine a main direction of contrast bolus progression. The contrast enhancement may be used to determine a size of the tubular structure through which the contrast bolus progresses. The area may be calculated from an estimate of the direction of contrast bolus progression, an estimated structure size, and/or an estimate of the amount of progression along the calculated direction beyond the current bolus location.

The direction of contrast bolus progression may be calculated from probabilities of individual pixels/voxels being inside a tubular structure. The direction of contrast bolus progression may be calculated from a segmentation of the tubular structure.

The tubular structure's size may be calculated from the response of a parameterized filter over the probabilities of individual pixels/voxels being inside a tubular structure. The tubular structure's size may be calculated from a segmentation of the tubular structure The amount of contrast bolus progression beyond the current location, e.g. along the direction of contrast bolus progression, may be predicted from the size of the structure.

The amount of contrast bolus progression beyond the current location, e.g. along the direction of contrast bolus progression, may be predicted from the size of the structure and the rate of introduction into the tubular structure.

According to certain embodiments there may be provided an image processing method for registering two angiographic images of the same anatomy, wherein the time points associated with the images (e.g. images at times t and u) differ, wherein a contrast bolus location in the two images may differ, and wherein a contrast enhancement in the image at time u is a progression of the enhancement at time t.

The registering may takes as inputs a modified version of the image at time t and the original image at time u. A spatial extent of the modification may be the or a predicted image area affected by contrast bolus progression. The modification may comprise simulating contrast progression from time t and adding this to the image for time t. The simulating may comprise running a diffusion process parameterized by the or an estimated direction of contrast bolus progression, the or an estimated structure size and/or the or an estimated amount of progression. The simulating may comprise generating an optimum intensity profile for the or a filter response given the estimated structure size, extruded along the estimated direction by the estimated amount. The amount of extension may be optimized with respect to intensity distributions of the modified image and the original image.

The registering may comprise disregarding image information in the or an image area predicted to be affected by contrast bolus progression. A transformation in said area may be transplanted from the or a contrast-enhanced area immediately preceding and/or adjacent to said area.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image processing apparatus, comprising:
   processing circuitry configured to:
   obtain first medical image data of a region of a patient captured at a first time and second medical image data of the region of the patient captured at a second time different from the first time, the first medical image data and the second medical image data including data representing a bolus of contrast material in a tubular anatomical structure, wherein the bolus of the contrast material has moved between the first time and the second time;
   determine an expected motion of the bolus of the contrast material through the tubular anatomical structure between the first time and the second time; and
   perform a registration process to obtain a registration of the first medical image data of the region of the patient and the second medical image data of the region of the patient based at least in part on the expected motion of the bolus of the contrast material through the tubular anatomical structure, wherein the registration represents a spatial transformation of the region of the patient as represented in the first medical image data or the second medical image data,
   wherein the processing circuitry is further configured to modify at least one of the first image data, the second image data, and/or the registration process based on the expected motion of the bolus of the contrast material, and use the modified first image data, the modified second image data, and/or the modified registration procedure to obtain the registration.

2. The apparatus according to claim 1, wherein the processing circuitry is further configured to perform the registration process by extending and/or shortening a contrast region where the bolus of the contrast material is present, and using the extended and/or shortened contrast region in the registration process.

3. The apparatus according to claim 1, wherein the processing circuitry is further configured to determine the expected motion of the bolus by estimating a size and/or a direction of the tubular structure, and using the estimated size and/or the direction of the tubular structure in the determining of the expected motion of the bolus.

4. The apparatus according to claim 3, wherein the processing circuitry is further configured to determine the expected motion by extending a model of the tubular structure of the estimated size in the estimated direction and determining the position of the bolus at the second time based on the model.

5. The apparatus according to claim 3, wherein the processing circuitry is further configured to estimate the size and/or the direction of the tubular structure by performing a segmentation process to identify the tubular structure.

6. The apparatus according to claim 5, wherein the filter comprises a Sato filter or a Frangi filter.

7. The apparatus according to claim 5, wherein the filter provides a probability for pixels or voxels of the first image data and/or second image data of the pixels or voxels being part of, or within, the tubular anatomical structure.

8. The apparatus according to claim 3, wherein the processing circuitry is further configured to estimate the size and/or the direction of the tubular structure by applying a filter to the first image data and/or second image data.

9. The apparatus according to claim 1, wherein the processing circuitry is further configured to determine the expected motion of the bolus by applying a model representing a diffusion process to determine the expected motion of the bolus of the contrast material.

10. The apparatus according to claim 1, wherein the processing circuitry is configured to modify the at least one of the first image data, the second image data, and/or the registration process by removing or modifying data representing the bolus of the contrast material.

11. The apparatus according to claim 1, wherein the processing circuitry is configured to modify the at least one of the first image data, the second image data, and/or the registration procedure by adding simulated data representing the bolus of the contrast material.

12. The apparatus according to claim 1, wherein the processing circuitry is configured to modify the at least one of the first image data, the second image data, and/or the registration process by copying data representing the bolus from one of the first image data and the second image data to the other of the first image data and the second image data.

13. The apparatus according to claim 1, wherein the processing circuitry is configured to modify the at least one of the first image data, the second image data, and/or the registration process by ignoring or weighting a contrast region where the bolus of the contrast material is present or is expected to be present.

14. The apparatus according to claim 1, wherein the processing circuitry is configured to modify the registration process by using at least one deformation field value, or other registration parameter value, obtained for a different region for a contrast region where the bolus of the contrast material is present or is expected to be present.

15. The apparatus according to claim 1, wherein the first image data and the second image data obtained by the processing circuitry comprise angiographic data.

16. The apparatus according to claim 1, wherein the first image data and second image data obtained by the processing circuitry each represents respective different phases of multi-phase angiographic data.

17. The apparatus according to claim 1, wherein the processing circuitry is further configured to transform at least one of the first image data and the second image data based on the determined expected motion.

18. A method of processing image data, comprising:
    obtaining first medical image data of a region of a patient captured at a first time and second medical image data of the region of the patient captured at a second time different from the first time, the first medical image data and the second medical image data including data representing a bolus of contrast material in a tubular anatomical structure, wherein the bolus of the contrast material has moved between the first time and the second time;
    determining an expected motion of the bolus of the contrast material through the tubular anatomical structure between the first time and the second time; and
    performing a registration process to obtain a registration of the first medical image data of the region of the patient and the second medical image data of the region of the patient based at least in part on the expected motion of the bolus of the contrast material through the tubular anatomical structure, wherein the registration represents a spatial transformation of the region of the patient as represented in the first medical image data or the second medical image data, wherein the method further comprises modifying at least one of the first image data, the second image data, and/or the registration process based on the expected motion of the bolus of the contrast material, and using the modified first image data, the modified second image data and/or the modified registration procedure to obtain the registration.

19. The method of claim 18, further comprising performing the registration process by extending and/or shortening a contrast region where the bolus of the contrast material is present, and using the extended and/or shortened contrast region in the registration process.

20. A non-transitory computer program product comprising computer-readable instructions that are executable to perform a method comprising:

obtaining first medical image data of a region of a patient captured at a first time and second medical image data of the region of the patient captured at a second time different from the first time, the first medical image data and the second medical image data including data representing a bolus of contrast material in a tubular anatomical structure, wherein the bolus of the contrast material has moved between the first time and the second time;

determining an expected motion of the bolus of the contrast material through the tubular anatomical structure between the first time and the second time; and performing a registration process to obtain a registration of the first medical image data of the region of the patient and the second medical image data of the region of the patient based at least in part on the expected motion of the bolus of contrast material through the tubular anatomical structure, wherein the registration represents a spatial transformation of the region of the patient as represented in the first medical image data or the second medical image data, wherein the method further comprises modifying at least one of the first image data, the second image data, and/or the registration process based on the expected motion of the bolus of the contrast material, and using the modified first image data, the modified second image data, and/or the modified registration procedure to obtain the registration.

\* \* \* \* \*